US012428966B2

(12) United States Patent
Beljambe et al.

(10) Patent No.: US 12,428,966 B2
(45) Date of Patent: Sep. 30, 2025

(54) FAN MODULE HAVING VARIABLE-PITCH BLADES

(71) Applicant: SAFRAN AIRCRAFT ENGINES, Paris (FR)

(72) Inventors: Ceddric Beljambe, Moissy-Cramayel (FR); Gilles Alain Marie Charier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/292,611

(22) PCT Filed: Aug. 1, 2022

(86) PCT No.: PCT/FR2022/051535
§ 371 (c)(1),
(2) Date: Jan. 26, 2024

(87) PCT Pub. No.: WO2023/012425
PCT Pub. Date: Feb. 9, 2023

(65) Prior Publication Data
US 2024/0337195 A1 Oct. 10, 2024

(30) Foreign Application Priority Data
Aug. 4, 2021 (FR) ........................ 2108461

(51) Int. Cl.
F01D 7/00 (2006.01)
(52) U.S. Cl.
CPC ............ F01D 7/00 (2013.01); F05D 2260/79 (2013.01)
(58) Field of Classification Search
CPC ............................... F01D 7/00; F05D 2260/79
See application file for complete search history.

(56) References Cited

U.S. PATENT DOCUMENTS

2014/0322017 A1* 10/2014 Duval ...................... F01D 7/00
416/147
2016/0032740 A1* 2/2016 Niergarth .................. F02C 3/04
416/112

(Continued)

FOREIGN PATENT DOCUMENTS

EP    3 647 546 A1    5/2020
FR    3046432 A1 *    7/2017    ............ B64C 11/32

(Continued)

OTHER PUBLICATIONS

Translation FR-3046432-A1 (Year: 2025).*

(Continued)

Primary Examiner — J. Todd Newton
(74) Attorney, Agent, or Firm — CHRISTENSEN O'CONNOR JOHNSON KINDNESS PLLC

(57) ABSTRACT

A fan module having variable-pitch blades is configured for use with for a propulsion unit having a longitudinal axis. The fan module includes a rotary casing carrying the blades and a pitch-changing system. The pitch-changing system includes a control device that includes an annular actuator having a stationary body added onto the rotary casing and a body configured to translate with respect to the stationary body along the longitudinal axis. A linking mechanism includes a synchronizing ring coupled to the mobile body, connected to the blades and configured to be translated along the longitudinal axis by the mobile body so as to change the pitch of the blades. A feathering device includes fly-weights coupled to the ring by a connecting rod of which the ends include ball-and-socket joints.

11 Claims, 6 Drawing Sheets

(56) References Cited

U.S. PATENT DOCUMENTS

2018/0335046 A1* 11/2018 Charier .................. F01D 25/16
2018/0335047 A1* 11/2018 Charier ................. F04D 29/323

FOREIGN PATENT DOCUMENTS

| FR | 3 055 001 A1 | 2/2018 | | |
|---|---|---|---|---|
| FR | 3 059 364 A1 | 6/2018 | | |
| FR | 3 066 558 A1 | 11/2018 | | |
| FR | 3 066 559 A1 | 11/2018 | | |
| FR | 3126018 A1 * | 2/2023 | ............. | B64C 11/06 |

OTHER PUBLICATIONS

Translation FR-3126018-A1 (Year: 2025).*
International Search Report mailed Nov. 22, 2022, issued in corresponding International Application No. PCT/FR2022/051535, filed Aug. 1, 2022, 6 pages.
Written Opinion mailed Nov. 22, 2022, issued in corresponding International Application No. PCT/FR2022/051535, filed Aug. 1, 2022, 7 pages.

* cited by examiner

FAN MODULE HAVING VARIABLE-PITCH BLADES

FIELD OF THE DISCLOSURE

The present disclosure relates to a fan module having variable-pitch blades for a propulsion assembly, and more specifically to a device for feathering the blades suitable for such a fan.

BACKGROUND

The technical background comprises in particular the documents FR 3 066 559 A1, FR 3 059 364 A1, EP 3 647 546 A1 and FR 3 055 001 A1.

A fan equipped with variable pitch blades (referred by the acronym VPF for "Variable Pitch Fan") allows to adjust the pitch (and more precisely the pitch angle) of the blades as a function of the flight parameters, and thus to optimize the operation of the fan, and in general of the propulsion assembly in which such a fan is integrated. As a reminder, the pitch angle of a blade corresponds to the angle, in a longitudinal plane perpendicular to the axis of rotation of the blade, between the chord of the blade and the plane of rotation of the fan.

It is known that propulsion assemblies or turbomachines generally comprise a shrouded fan or a non-shrouded propeller equipped with variable pitch movable vanes, equipped with these pitch change systems.

In the category of the turbomachines with at least one non-shrouded propeller, also referred as "open rotor" or "unducted fan", there are those with a single non-shrouded propeller and a stator vane comprising several stator vanes (referred by the acronym USF for "Unducted Single Fan").

An open-rotor turboshaft engine mainly comprises a coaxial "gas generator" portion and a coaxial "propulsion" portion inside a stationary cylindrical casing supported by the aircraft structure. The gas generator portion can be arranged upstream or downstream of the propulsion portion. The terms "upstream" and "downstream" are defined in relation to the circulation of the gases in the turbomachine. The propulsion portion comprises at least one propeller driven in rotation by a turbine, in particular a low-pressure turbine, of the gas generator portion via a reduction gear, for example with epicyclic gear trains. In some cases, the propulsion portion may comprise two coaxial, counter-rotating propellers, upstream and downstream respectively, which are driven in opposite rotation by the turbine of the gas generator via the reduction gear. The propeller or propellers extend substantially radially from the longitudinal axis of the drive shaft outside the casing.

Generally speaking, the or each propeller comprises a substantially cylindrical rotary casing carrying an outer polygonal annulus hub in a rotative manner received about the longitudinal axis in the stator of the turbomachine. The annulus comprises radial cylindrical housings distributed around its periphery around the longitudinal axis. Shafts with radial axes, perpendicular to the longitudinal axis of the turbomachine, secured to the roots of the blades, are received in the housings of the polygonal annulus and also pass through radial passages in the cylindrical casing.

To allow the turboshaft engine to operate optimally in the various flight phases encountered, the blades of the propellers can rotate in the radial housings of the polygonal annulus. To do this, they are driven in rotation about their respective pivot axes, referred to as the pitch axis, by an appropriate system that allows the pitch of the blades to be varied during flight, i.e. the pitch of the propellers.

This system for changing the pitch of the blades of the propellers covers an angular range of rotation between two extreme positions, namely a "reverse" extreme position in which the blades extend, for example, 30° beyond the plane transverse to the axis of the turboshaft engine (the direction of forward travel of the aircraft) in order to help brake the aircraft, in the manner of conventional thrust reversers, and a "feathering" extreme position in which the blades are then retracted as far as possible from the direction of forward travel, for example, in the event of an engine failure or in the event of a failure (or breakdown) of the device controlling the blade pitch (for example, a failure of a hydraulic actuator) so that the latter offer as little resistance (drag) as possible.

Generally speaking, a system for changing the pitch of the blades of a propeller comprises a control device and a connection mechanism connecting the control means to each blade of the propeller to ensure the desired angular pivoting of the blades.

In addition, the blades are generally feathered using counterweights. Usually, the counterweights are placed on the root of each blade and are potentially very heavy depending on the available space and they are centrifugally loaded and therefore increase the stress on the root of the blades and the bearings at the root of the blades, which are already very stressed.

Various solutions have been proposed for changing the pitch of the blades of a fan and feathering the blades on "open rotor" type turboshaft engines or others.

For example, we know from the document FR 3 066 559, a system for changing the pitch of the blades comprising a single annular jack arranged on a stationary casing or internal stator with respect to the hub of the fan and a connection mechanism comprising a transfer bearing, better known by the English acronym LTB for "Load Transfer Bearing", attached on one side to the movable portion of the jack and cooperating, on the other side, with a means for connecting the mechanism to the blades of the rotating hub, in such a way that the load transfer bearing of the mechanism driven in rotation transmits the translational displacement of the movable portion of the stationary jack, to the connecting means of the rotary mechanism in order to change the orientation of the blades of the propeller. This pitch change system also comprises a blade feathering device comprising counterweights with a lever mechanism arranged in the rotary reference frame, linked to the outer ring of the load transfer bearing. The use of counterweights with a lever mechanism acting on the jack allows to multiply the effort and takes advantage of empty space to reduce the mass of the counterweights and avoid stressing the root of the blades.

Having a linear actuator in a stationary reference frame makes it easier to supply oil and reduces the rotating masses. However, this solution requires a flat kinematics for the counterweight mechanism, which means that the pitch change mechanism must have a purely axial movement. The need for purely axial movement means that either the lever system has to be oversized or an external mechanism, which is generally bulky and heavy, has to be used to provide the anti-torque function. Moreover, if the pitch change mechanism is purely axial, a greater force is required for actuation, and this translates into internal forces and therefore additional mechanical stresses. Furthermore, the lever counterweight mechanism as presented is hyperstatic, making it difficult to dimension, manufacture and assemble.

In addition, the lever mechanism according to this solution has a cavity with an evacuation pipe, to evacuate the oil needed for the pitch change mechanism comprising load transfer bearings that require lubrication, which can be technically complicated.

The present disclosure proposes a device for feathering the blades allowing to overcome at least some of these disadvantages.

SUMMARY

To this end, the disclosure relates to a fan module having variable-pitch blades for a longitudinal axis propulsion assembly, the module comprising:
- a rotary casing that rotates about the longitudinal axis and carries the blades,
- a system for changing the pitch of the blades comprising a control device and a connection mechanism, the control device comprising an annular actuator centered on the longitudinal axis having a stationary body fitted to the rotary casing and a body movable in translation relative to the stationary body along the longitudinal axis, the movable body being coupled to a synchronizing ring gear of the connection mechanism, the synchronizing ring gear being connected to the blades and configured to be driven in translation along the longitudinal axis by the movable body so as to change the pitch of the blades; and
- a device for feathering the blades, in particular in the event of failure of the control device, the feathering device comprising an annular row of fly-weights carried by the rotary casing, characterized in that the annular row of fly-weights is coupled to the synchronizing ring gear, each of the fly-weights being connected to the synchronizing ring gear by a connecting rod, a first and a second end of which comprise ball-and-socket joints, and the fly-weights being configured, under the centrifugal effect, to move into a position in which the synchronizing ring gear imposes a feathered position on the blades.

The disclosure thus allows to ensure an efficient passive feathering of the blades of a fan by multiplying the centrifugal force of each fly-weight while having lower restoring forces during the thrust reversal phase.

The disclosure transforms two of the pivoting connections of the lever mechanism into ball-and-socket joints so that the pitch actuation kinematics are not hyperstatic and have a translational and rotational movement without blocking and therefore without the need for an external mechanism to provide the anti-torque function.

Moreover, even allowing for a slight oversizing of the counterweight to take account of additional force projection, the module is lighter overall and less bulky. The disclosure allows the pitch change system to have a helical movement and also makes the lever counterweight system isostatic.

In addition, as the disclosure has no load transfer bearings, it allows to limit the spread of the fluids, particularly the lubricating oil. A drainage of potential leaks from the actuator is still useful, but the disclosure no longer has a cavity or pipe.

The fan module according to the disclosure may comprise one or more of the following characteristics, taken in isolation from each other or in combination with each other:
- the ball-and-socket joints connecting the first end of the connecting rod to the synchronizing ring gear and connecting the second end of the connecting rod to the fly-weights have perpendicular axes;
- the feathering device comprises levers, each articulated about an axis C stationary with respect to the rotary casing arranged between a first and a second arm of the lever, the first arm being secured to a fly-weight and the second arm being connected to the second end of the connecting rod by one of the ball-and-socket joints, the two arms being stationary with respect to each other;
- each lever is articulated with respect to the casing by a pivot connection, preferably formed by a needle bearing or two ball bearings;
- the rotary casing comprises an annular cap, and at least one lever is articulated about the axis relative to the cap;
- the cap comprises at least one orifice for the passage of the second arm of the at least one lever articulated with respect to the cap, the first arm of the lever being located radially outside the cap;
- the or each orifice in the cap comprises a deflector extending radially inwards around the periphery of the orifice.

The disclosure also relates to a longitudinal axis propulsion assembly comprising at least one fan module with variable pitch blades according to the disclosure and as previously described.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different embodiments have the same references in the figures.

DETAILED DESCRIPTION

The disclosure applies to a propulsion assembly intended to be mounted on an aircraft. The aircraft comprises a fuselage and at least two wings extending on either side of the fuselage along the axis of the fuselage. At least one propulsion assembly is mounted under each wing, for example. The propulsion assembly can be a turbojet engine, for example a propulsion assembly equipped with a shrouded fan (turbofan) or a turboprop engine, for example a propulsion assembly equipped with a non-shrouded propeller (open rotor, USF for "Unducted Single Fan" or UDF for "Unducted Fan"). Of course, the disclosure can be applied to other types of propulsion assemblies, for example comprising two coaxial, counter-rotating propellers.

In general and in the following description, the term "fan" is used to designate either a fan or a propeller.

Figure 1:
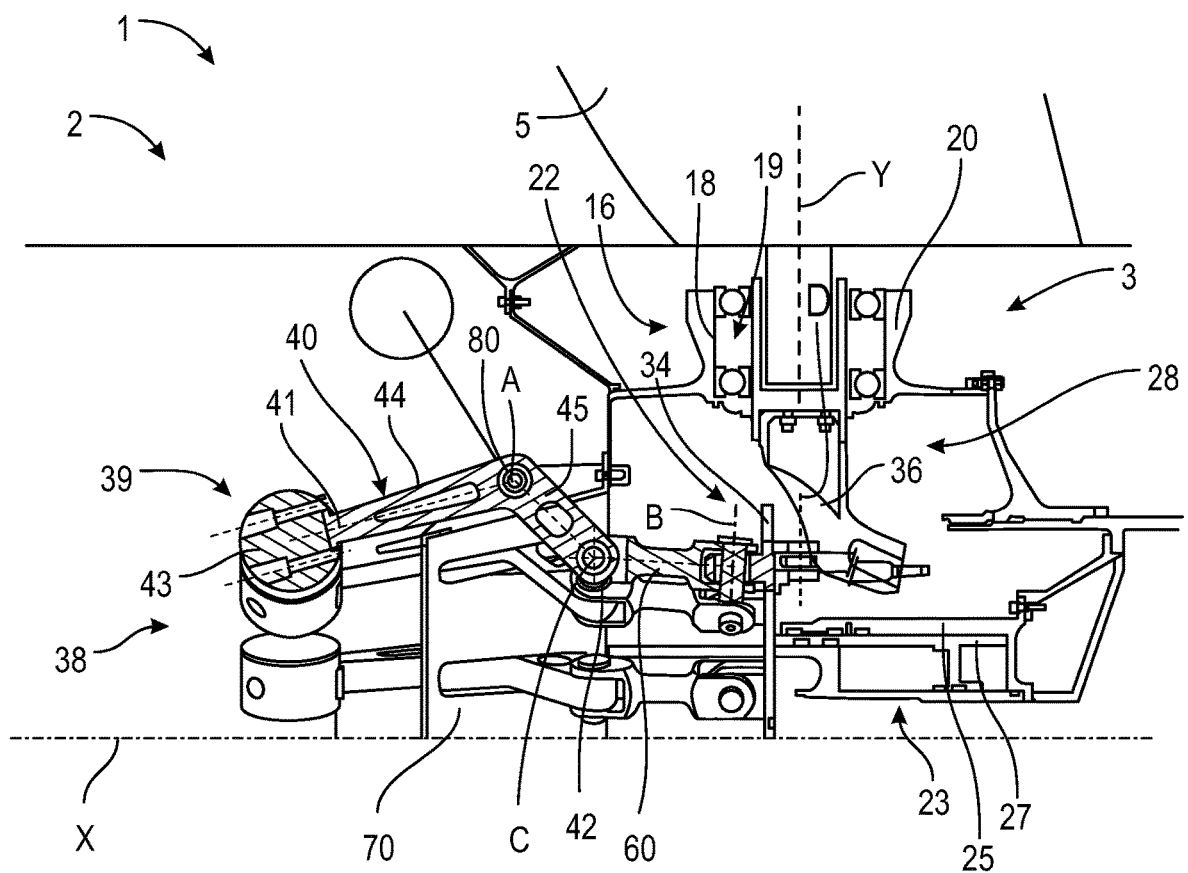
FIG. 1 is an axial (or longitudinal) half-section view of a fan module comprising a device for feathering the blades, in a first position, in an axial plane passing through the axis of rotation of a blade of the fan.
Figure 2:
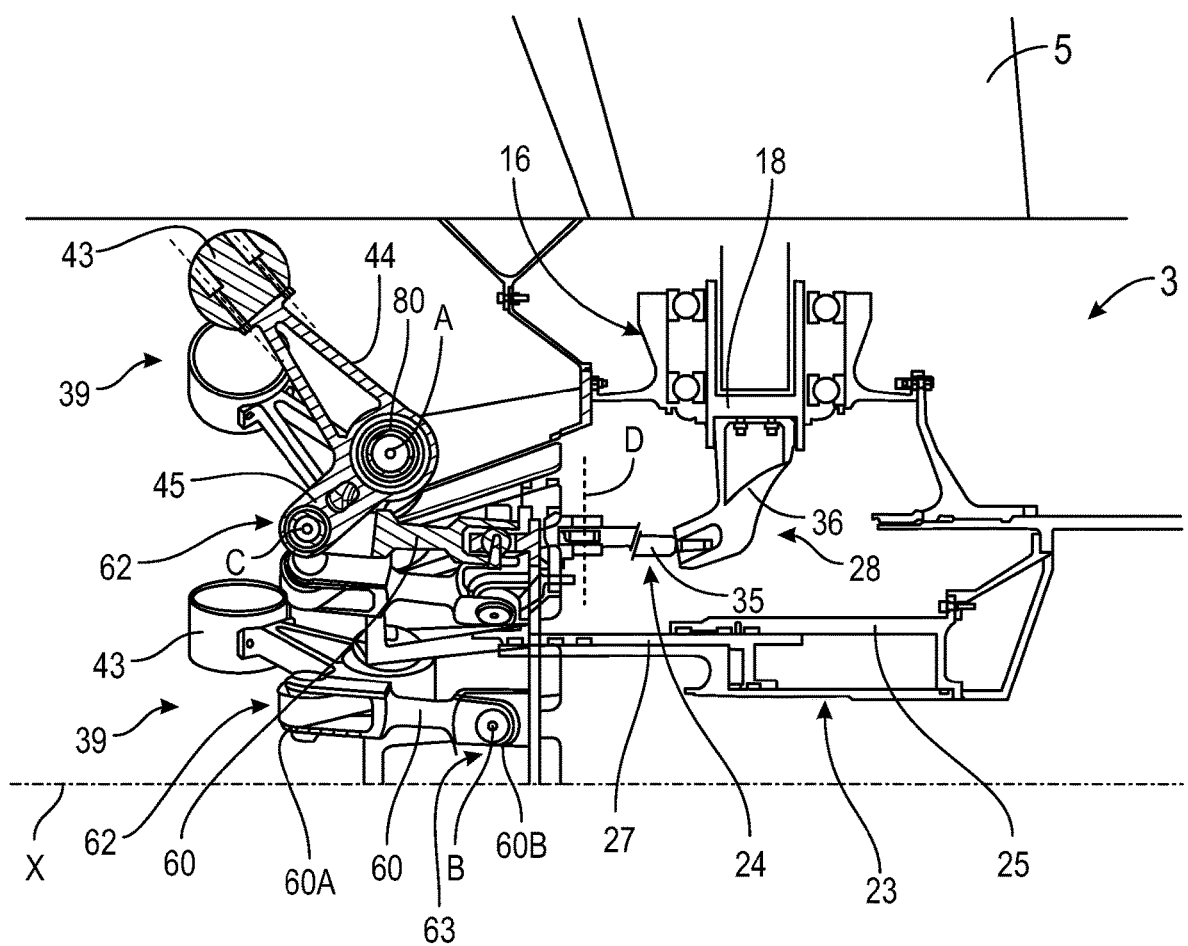
FIG. 2 is an axial half-section view of the fan module of FIG. 1 in which the blade feathering device is in a second position, in an axial plane passing outside the axis of rotation of a blade of the fan.

FIGS. 1 and 2 show a fan 1 of a propulsion assembly 2 with a longitudinal X axis. The fan 1 comprises a rotary casing or rotor 3 which is movable about the axis X relative to a stationary casing, the rotor 3 carrying a series of variable pitch blades 5. The fan 1 is located upstream of the engine portion of the propulsion assembly 2, which comprises, for example, a gas generator and a power turbine which drives the rotor 3 of the fan 1 via a speed reduction gear.

By convention, in this application, the terms "upstream" and "downstream" are defined in relation to the orientation of gas flow in the fan 1 (or propulsion assembly 2). Similarly, by convention in the present application, the terms "internal" and "external", "inside" and "outside" are defined radially with respect to the longitudinal (or axial) axis X of the propulsion assembly 2, which is in particular the axis of rotation of the rotors of the compressors and turbines of the gas generator.

The rotary casing 3 comprises an internal annular shaft centered on the axis X which, in operation, is driven by the power turbine via the speed reduction gear. The rotary casing 3 also comprises an annulus 16 for supporting the blades 5.

More specifically, each blade 5 comprises a root, for example in the form of a bulbous attachment, this root being secured to a pivot 18 mounted in a housing 19 of a base 20 projecting from the annulus 16 so as to be rotatable about a substantially radial axis Y via two rolling bearings. The rolling bearings in each housing 19 are generally lubricated with grease.

The fan comprises a system 22 for changing the pitch of the blades 5 or a system for pitching the blades 5 about their axis Y, and more precisely the pitch angle of the blades 5 which corresponds for a blade 5 to the angle, in a longitudinal plane perpendicular to the axis Y, between the chord of the blade 5 and the plane of rotation of the fan 1.

Figure 3:
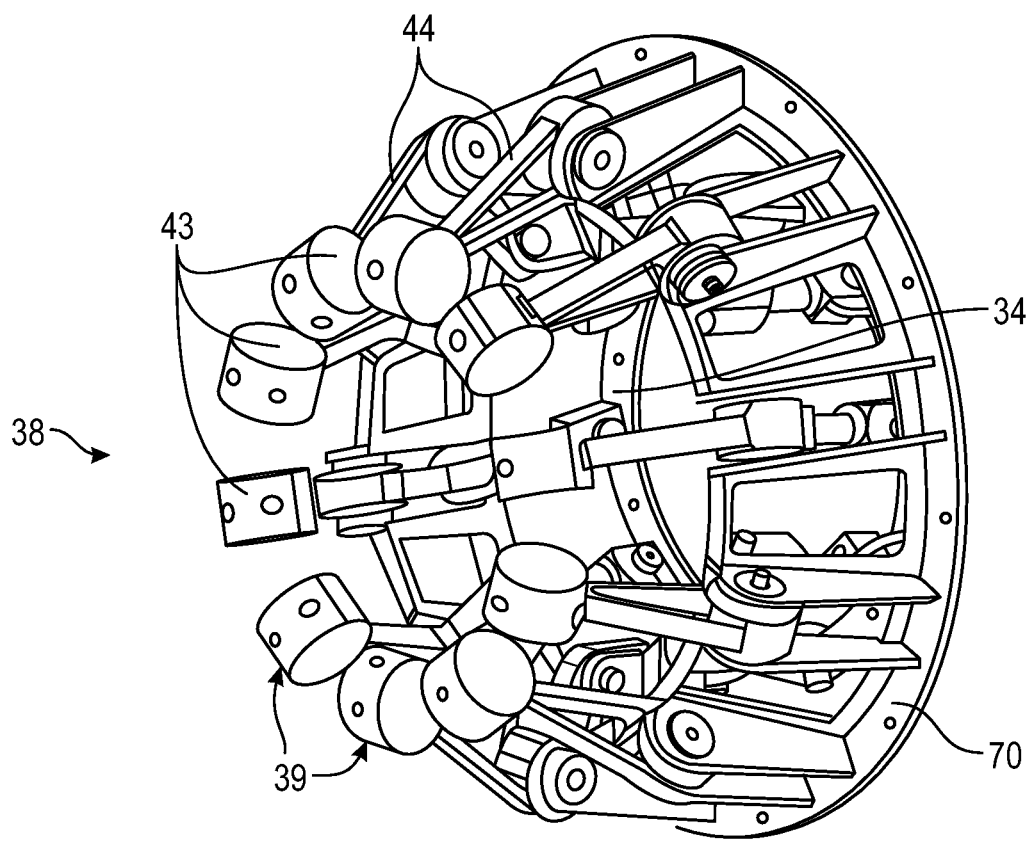
FIG. 3 is a detailed perspective view of the blade feathering device shown in FIG. 1.

FIGS. 1 and 3 show the blades 5 in the "reverse" position. In the "reverse thrust" position, the blade pitch angle 5 is negative. This position of the blades 5 allows to generate a counter-thrust, and thus to contribute to the slowing down of the aircraft in addition to the brakes, so as to reduce its braking distance on landing.

Figure 4:
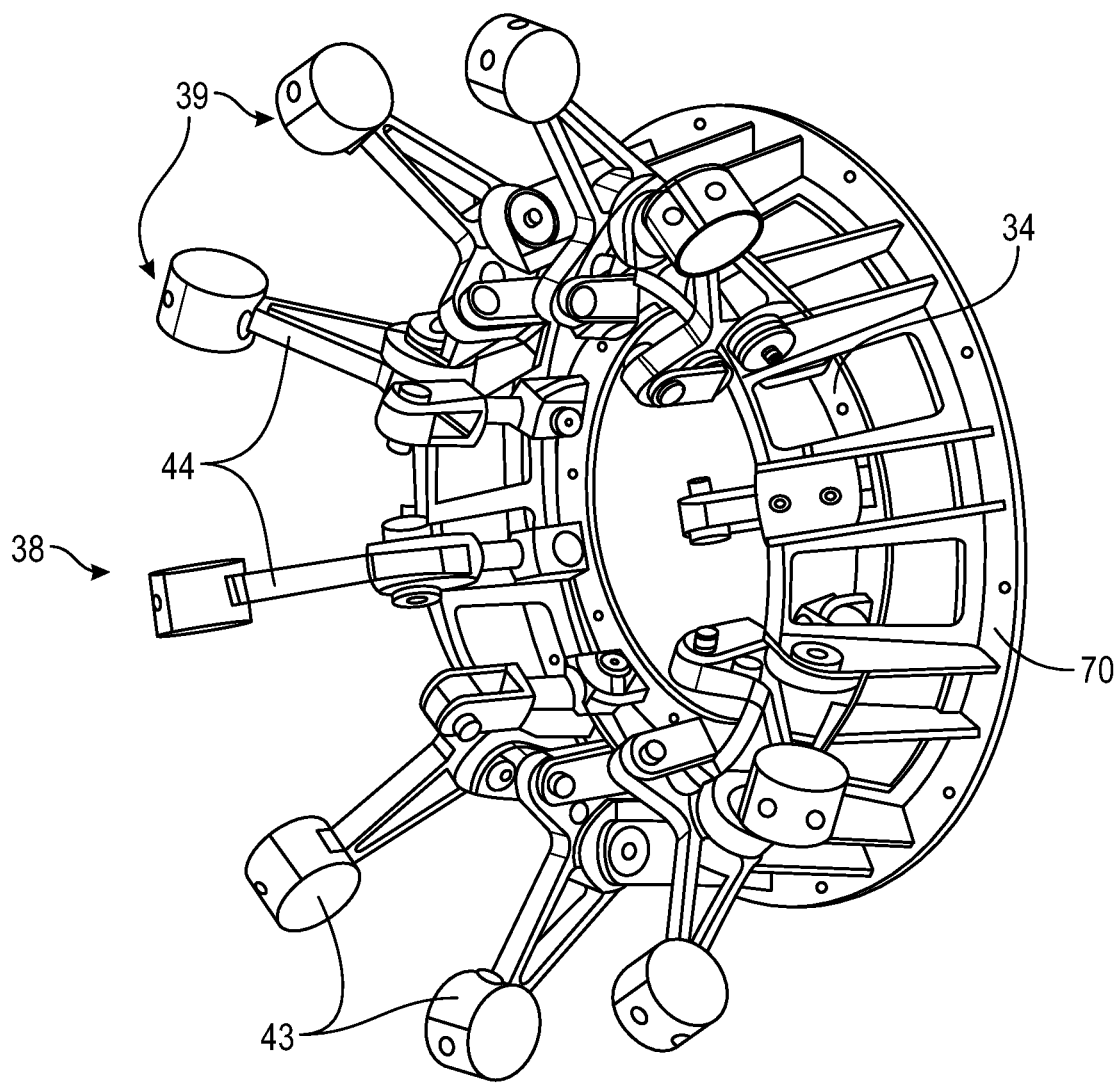
FIG. 4 is a detailed perspective view of the blade feathering device shown in FIG. 2.

The blades 5 are set in feather position in FIGS. 2 and 4. In the feather position, the pitch angle is positive and generally approximately equal to 90°. This position of the blades 5 allows to limit the drag generated by them.

According to the embodiment illustrated in the figures, and in particular FIGS. 1 and 3, the system for changing the pitch 22 of the blades 5 comprises a control device or linear annular actuator 23, centered on the axis X, common to all the blades 5 and a connection mechanism 24 connected to each blade 5, this connection mechanism 24 allowing to transform the linear movement initiated by the actuator 23 into a rotational movement of the corresponding blade 5.

More specifically, the linear actuator 23 comprises a stationary annular body 25 fitted to an annular support (centered on X) of the rotor 3, and is therefore arranged in the rotating reference frame linked to the rotor. In other words, the stationary body 25 is secured in rotation to the rotor 3. The linear actuator 23 also comprises a movable body 27, which is movable in translation relative to the stationary body 25 along the axis X. Advantageously, the linear actuator 23 is hydraulic. Preferably, the actuator 23 is a hydraulic jack comprising a stationary cylinder secured to the shaft of the rotor 3 forming the stationary body 25 of the actuator and a stem forming the movable body 27 of the actuator.

The connection mechanism 24 of the pitch change system 22 also comprises a synchronizing ring gear 34 secured to the movable body 27 of the actuator 23. The synchronizing ring gear 34 is centered on the longitudinal axis X and is designed to drive the pitch of the blades 5 simultaneously.

The connection mechanism 24, which transforms the linear movement of the actuator into a rotational movement of the blade 5, also comprises a connecting rod 35 for each blade 5. One of the ends of the connecting rod 35 is mounted so as to rotate freely along a substantially radial axis D with the synchronization ring gear 34 via a clevis and the other end is mounted so as to rotate freely with an eccentric 36 connected to the root of the corresponding blade 5 via a splined connection, for example. The axis D is offset with respect to the axis Y of rotation of the blade 5. The connecting rod 35 and the eccentric 36 are used to reduce the force required to set the pitch of the corresponding blade 5.

The linear movement of the movable body 27 of the actuator 23 allows synchronized setting of the pitch of the assembly of the blades 5, in particular via the synchronizing ring gear 34.

The fan 1 also comprises a device for feathering 38 the blades 5, in particular in the event of failure (or breakdown) of the pitch change device 22, and for example a failure in the hydraulic supply to the linear actuator 23. As a reminder, the feather position corresponds to a positive setting of the pitch, generally approximately equal to 90°.

The feathering device 38 comprises at least one mechanism 39 comprising at least one lever 40 articulated by a pivot connection 80 about an axis A stationary relative to the rotor 3. The axis A is straight and perpendicular to the axis X. The lever 40 has a first end 41 and a second end 42. A fly-weight 43 is secured to the first end 41 and the second end 42 is coupled to the synchronizing ring gear 34 via a connecting rod 60. Under centrifugal effect, the fly-weight 43 can be moved to a position (see FIGS. 2 and 4) in which the synchronizing ring gear 34 imposes a feather position on the blades 5. The mechanisms 39 of the feathering device 38 are evenly angularly spaced around the axis X. Thus, the assembly of the fly-weights 43 form an annular row centered on the longitudinal axis X and spaced at regular angles.

In the embodiment illustrated in FIGS. 3 and 4, the feathering device 38 comprises ten mechanisms 39 distributed at regular angles around the axis X.

According to the embodiment shown in the figures, for each mechanism 39, the lever 40 is L- or V-shaped in axial cross-section. The lever comprises two angularly-spaced branches connected at the level of the articulation of the lever at A by a pivot connection, preferably a first branch 44 supporting the fly-weight and a second branch 45 coupled to the synchronizing ring gear 34 by means of the connecting rod 60. The length of the first branch 44 is greater than the length of the second branch 45, in this case approximately twice as long. This length ratio allows to multiply the effort provided by each fly-weight 43, and in other words to minimize their mass, and more generally, the mass of all the assembly of the fly-weights 43.

The lever is articulated with respect to the A-shaped rotary casing by a pivot connection, preferably formed by a needle bearing or two ball bearings.

The second end 42 of the lever 40 and an upstream axial end 60A of the connecting rod 60 are coupled by a first spherical articulation 62 about an axis C, commonly referred to as a ball joint or ball-and-socket joint. Similarly, a downstream axial end 60B of the connecting rod 60 is articulated in a clevis of the synchronizing ring gear 34, preferably by a second spherical articulation about an axis D.

Figure 5:
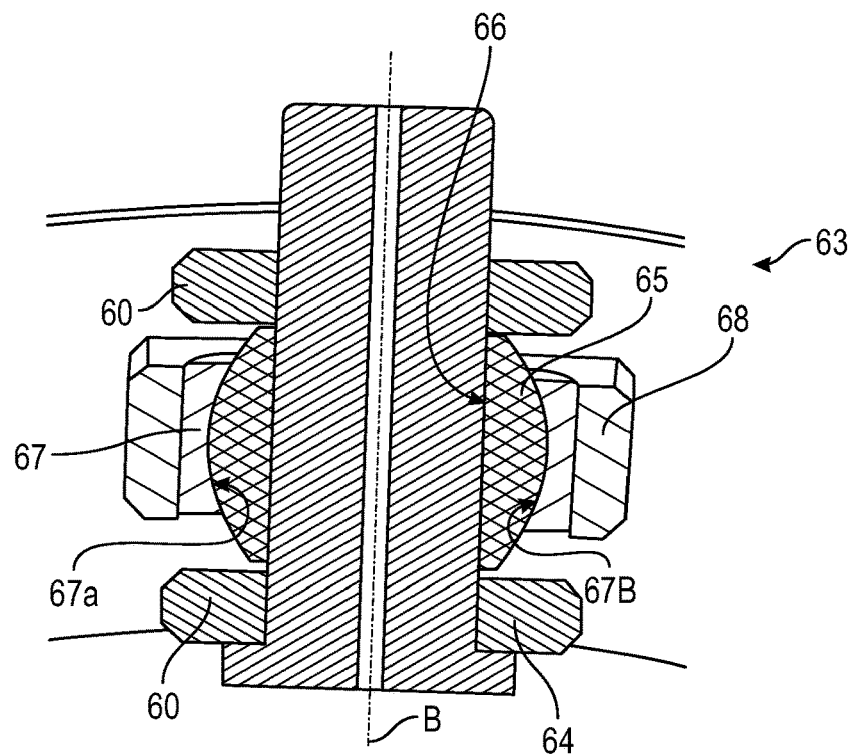
FIG. 5 schematically illustrates one of the spherical connections of the blade feathering device of FIGS. 1 and 2.

FIG. 5 illustrates this spherical articulation 63. This is securely mounted in a fork 64 at the downstream axial end of the connecting rod 60. The spherical articulation 63 comprises a sphere 65 with a radial hole 66, the sphere 65 being enclosed in a housing formed in a ring 67. The housing is delimited by two surfaces 67a, 67b forming half-sphere segments adapted to receive the sphere 65. The synchronizing ring gear 34 comprises a clevis 68 having a fork extending along the longitudinal axis X mounted so as to rotate freely about the annulus in contact with the sphere 65 along a substantially radial axis B. The first spherical articulation 62 is similar and has an axis C perpendicular to the axis B of the second spherical articulation 63. The orientations and the components of the connections at the ends 41 and 42 can be reversed. More specifically, the sphere 65 and its annulus 67 can be supported either by the synchronizing ring gear 34 or by the connecting rod 60 and the position of the axes B and C parallel or perpendicular to each other as shown.

Figure 6:
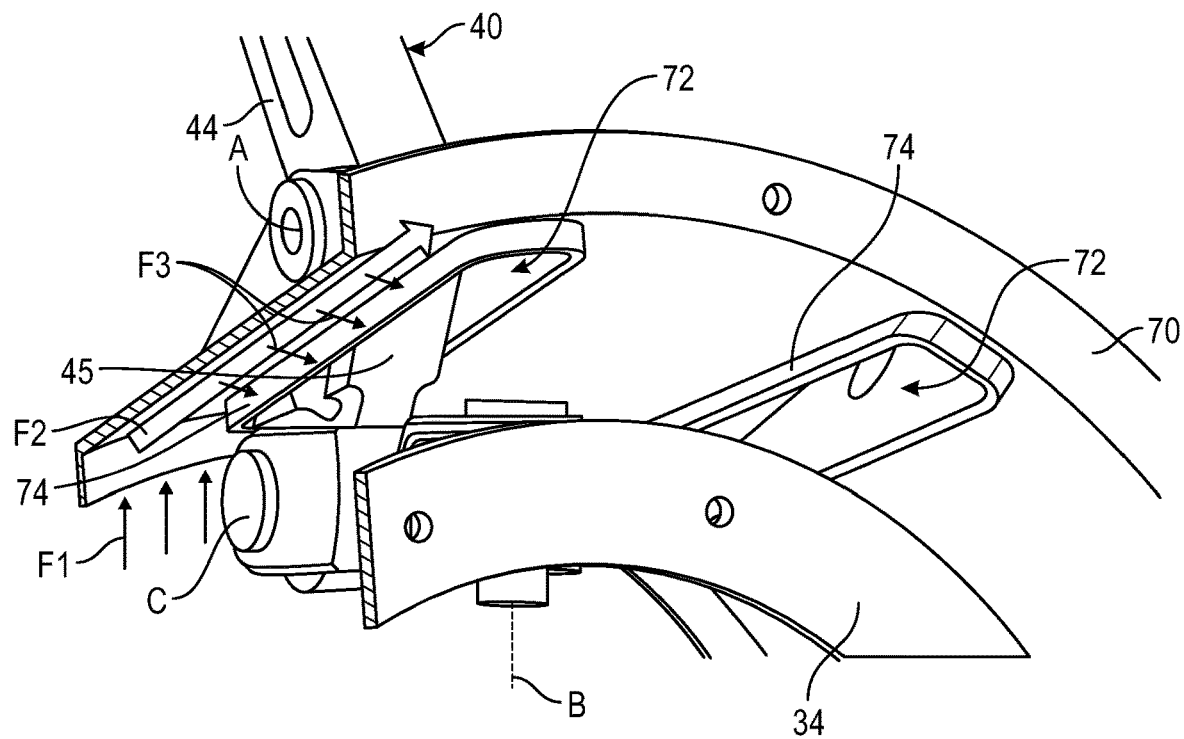
FIG. 6 is a detailed perspective view of a portion of the blade feathering device of FIG. 2.

In addition to its structural function, the rotary casing comprises a conical annular section, hereinafter referred to as annular cap 70, which widens from upstream to downstream, the levers being articulated about the axis A relative to the cap 70. More specifically, as shown in FIG. 6, the axis A passes (transversely) through the cap 70. The cap 70 comprises orifices 72 through which the second arm of the articulated levers passes with respect to the cap, the first arm of the lever and the corresponding fly-weight being located radially outside the cap 70.

In addition, each orifice of the cap advantageously comprises a deflector 74 extending radially inwards around the periphery of the orifice allowing to limit the radial propagation of fluid by centrifugal effect. During operation, the fluid is guided along the arrows F1, F2 and F3 without the need for evacuation pipes.

When the propulsion assembly 2 is operating normally (no fault), the feathering device 38 is subordinate to the pitch change system 22 for changing the pitch of the blades 5, and more specifically to the linear actuator 23. Note that when the blades 5 are in the "reverse thrust" position, the fly-weights 43 of the mechanisms 39 of the feathering device 38 of the blades 5 are close to the longitudinal axis X of the rotor 3 as shown in FIGS. 1 and 3.

In the event of a fault (need to feather the blades 5), for example a fault in the hydraulic supply to the linear actuator 23, the pitch change system 22 for changing the pitch of the blades 5 then becomes dependent on the feathering device 38, and more specifically on the fly-weights 43 which, under the centrifugal effect, move further away from the longitudinal axis X of the rotor 3 as shown in FIGS. 2 and 4, to impose a feathered position on the blades 5.

Figure 7:
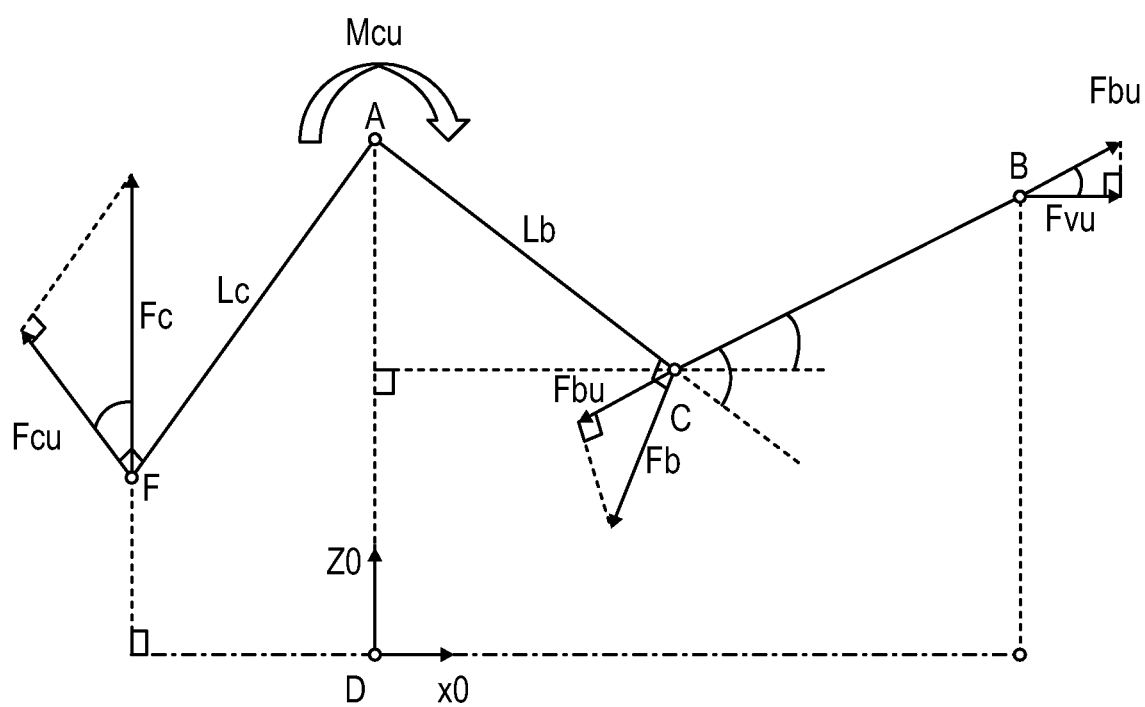
FIG. 7 schematically represents the forces of the blade feathering device according to the disclosure.

As shown in FIG. 7, each fly-weight 43 (at F) centrifuged by the rotation of the engine creates a centrifugal force Fc. Each fly-weight 43 is connected to a lever allowing centrifugal force to pass through the contact surface. The orthogonal component of this force Fcu via the lever arm Lc creates a moment Mcu. This moment is then transmitted via the lever arm Lb. This multiplies the centrifugal force through the lever via the ratio between Lc and Lb. The force Fb transmitted to the connecting rod at C is projected collinearly to its connections at Fbu. This tensile force is then transmitted to the jack, which recovers a force Fvu that drives it in translation towards the feather position.

The counterweight lever mechanism thus acts on the jack, which is kinematically connected to the actuation mechanism for actuating the blades. The number of lever counterweights is therefore independent of the number of blades. The lever counterweight mechanism imposes the direction of the feather position on the pitch actuation kinematics.

The disclosure as described has the advantages:
to minimize the mass of a counterweight return system,
to minimize the stress on the actuator,
to avoid problems of hyperstatism, and
to prevent the retention of fluids, particularly lubricating fluids.

It should be noted that the examples illustrated in the figures are by no means limitative; the pitch change system for changing the pitch of the blades according to the disclosure could, for example, be incorporated into the rotor of a propeller of a turboprop or even into the rotor of each of the two propellers of a turbomachine comprising two counter-rotating propellers, better referred to as "Open Rotor".

In addition, in the examples shown in the figures, the body of the jack is connected to the rotor (in the rotating reference frame) and the stem of the jack, which is attached to the stationary reference frame connected to the casing, can move in translation relative to the body of the jack, the synchronizing ring gear being connected to the stem of the jack. However, the disclosure could also be applied to a jack in which the body of the jack is attached to the synchronizing ring gear and is translationally movable relative to the stem of the jack. Depending on the configuration of the jack, the assembly of the feathering device is supported by a casing connected directly to the jack or to the structure of the engine.

Such a feathering device applies more generally to any turbomachine comprising a control device for controlling the pitch of the blades for which a feathering device is required.

The invention claimed is:

1. A fan module having variable pitch blades for a propulsion assembly having a longitudinal axis (X), the module comprising:
a rotary casing which rotates about the longitudinal axis (X) and carries the blades,
a system configured to change the pitch of the blades, the system comprising a control device and a connection mechanism, the control device comprising an annular actuator centered on the longitudinal axis (X) having a stationary body fitted to the rotary casing and a body movable in translation relative to the stationary body along the longitudinal axis (X), the movable body being coupled to a synchronizing ring gear of the connection mechanism, said synchronizing ring gear being connected to the blades and configured to be driven in translation along the longitudinal axis (X) by the movable body so as to change the pitch of the blades; and
a feathering device configured to feather the blades, said feathering device comprising an annular row of fly-weights carried by the rotary casing,
wherein the annular row of fly-weights is coupled to the synchronizing ring gear, each of the fly-weights being connected to the synchronizing ring gear by a connecting rod, a first and a second end of which comprise ball-and-socket joints, and the fly-weights being capable, under the centrifugal effect, of being displaced into a position in which the synchronizing ring gear imposes a feathered position on the blades, and wherein the system configured to change the pitch of the blades is devoid of a load transfer bearing.

2. The fan module according to claim 1, wherein the ball-and-socket joints connecting the first end of the connecting rod to the synchronizing ring gear and connecting the second end of the connecting rod to the fly-weights (43) have perpendicular axes.

3. The fan module according to claim 1, wherein the feathering device comprises levers, each articulated about an axis (A) stationary relative to the rotary casing arranged between a first and a second arms of the lever, the first arm being secured to a fly-weight and the second arm being connected to the second end of the connecting rod by one of the ball-and-socket joints, the two arms being stationary relative to each other.

4. The fan module according to claim 3, wherein each lever is articulated relative to the rotary casing by a pivot connection.

5. The fan module according to claim 4, wherein at least one of the pivot connections is formed by a needle bearing or by two ball bearings.

6. The fan module according to claim 3, wherein said rotary casing comprises an annular cap, and at least one lever is articulated about said axis (A) relative to the cap.

7. The fan module according to claim 6, wherein the cap comprises at least one orifice for passage of the second arm of the at least one lever articulated with respect to the cap, the first arm of the lever being situated radially outside the cap.

8. The fan module according to claim 7, wherein at least one of said at least one orifice in the cap comprises a deflector extending radially inwardly around a periphery of the orifice.

9. A propulsion assembly with a longitudinal axis (X) comprising at least one fan module with variable pitch blades according to claim 1.

10. The fan module according to claim 1, wherein the feathering device feathers the blades in the event of failure of said control device.

11. The fan module according to claim 1, wherein the connection mechanism further comprises a connecting rod connecting the synchronization ring gear to each of the blades.

* * * * *